United States Patent
Kondo et al.

(10) Patent No.: US 6,654,497 B1
(45) Date of Patent: Nov. 25, 2003

(54) IMAGE PROCESSING APPARATUS, METHOD AND STORAGE MEDIUM

(75) Inventors: Toshiaki Kondo, Singapore (SG); Masakazu Matsugu, Chiba (JP); Fumiaki Takahashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/484,586

(22) Filed: Jan. 18, 2000

(30) Foreign Application Priority Data

Jan. 18, 1999 (JP) .......................... 11-008605

(51) Int. Cl.⁷ ................................. G06K 9/48
(52) U.S. Cl. .................. 382/199; 382/195; 382/203; 382/218; 382/283; 382/316
(58) Field of Search .................. 382/103, 181, 382/195, 199, 200, 203, 205, 218, 254, 266, 316, 190, 283; 348/26, 169; 358/538

(56) References Cited

U.S. PATENT DOCUMENTS

| | | | | |
|---|---|---|---|---|
| 4,538,227 A | * | 8/1985 | Toraichi et al. | 378/62 |
| 4,805,127 A | * | 2/1989 | Hata et al. | 345/441 |
| 5,119,439 A | * | 6/1992 | Osawa et al. | 382/199 |
| 5,590,220 A | * | 12/1996 | Takahashi | 382/203 |
| 5,617,487 A | | 4/1997 | Yoneyama et al. | 382/199 |
| 5,881,171 A | * | 3/1999 | Kinjo | 382/199 |
| 5,930,391 A | * | 7/1999 | Kinjo | 382/173 |
| 6,393,151 B1 | * | 5/2002 | Yamamoto et al. | 382/200 |

FOREIGN PATENT DOCUMENTS

| | | |
|---|---|---|
| JP | 7-62873 | 2/1986 |
| JP | 63-55101 | 3/1988 |
| JP | 2645995 | 4/1988 |
| JP | 7-92650 | 4/1995 |
| JP | 8-50655 | 2/1996 |

OTHER PUBLICATIONS

Rogers, et al "a new technique for automatic contour extraction", IEEE, pp. 608–609, 1994.*

Hata, et al "automatic extraction and tracking of contours", IEEE, pp. 441–445, 1996.*

M. Kass et al., "Snakes: Active Contour Models", International Journal of Computer Visions, vol. 1, No. 4, 1987 pp. 321–331 (1988).

* cited by examiner

Primary Examiner—Daniel G. Mariam
(74) Attorney, Agent, or Firm—Fitzpatrick, Cella, Harper & Scinto

(57) ABSTRACT

There is disclosed an image processing apparatus. A contour interval intended to be extracted is designated (S1). A start point designated in S1 is used as the initial position of an attended point, and an end point is set as a target point of contour tracing (S2). A positional relation of the attended point and the target point is calculated (S3). A blind mask for blinding pixels in the vicinity of the attended point is prepared (S4). This mask processing permits a considerably free contour line tracing, while setting a restriction to securely converge to the target point. The pixel with the maximum edge strength is searched for from the pixels in the vicinity of the attended point (S5), and the searched contour pixel is set as a new attended point (S6). The operation is repeated from S3 to S6 until the new attended point reaches the target point (S7).

20 Claims, 9 Drawing Sheets

FIG. 4A

ADVANCING DIRECTION ←

| 1 | 1 | 0 |
|---|---|---|
| 1 | × | 0 |
| 1 | 1 | 0 |

DIRECTION #1

FIG. 4B

| 1 | 0 | 0 |
|---|---|---|
| 1 | × | 0 |
| 1 | 1 | 1 |

ADVANCING DIRECTION ↙

DIRECTION #2

FIG. 4C

| 0 | 0 | 0 |
|---|---|---|
| 1 | × | 1 |
| 1 | 1 | 1 |

ADVANCING DIRECTION ↓

DIRECTION #3

FIG. 4D

| 0 | 0 | 1 |
|---|---|---|
| 0 | × | 1 |
| 1 | 1 | 1 |

ADVANCING DIRECTION ↘

DIRECTION #4

FIG. 4E

| 0 | 1 | 1 |
|---|---|---|
| 0 | × | 1 |
| 0 | 1 | 1 |

ADVANCING DIRECTION →

DIRECTION #5

FIG. 4F

| 1 | 1 | 1 |
|---|---|---|
| 0 | × | 1 |
| 0 | 0 | 1 |

ADVANCING DIRECTION ↗

DIRECTION #6

FIG. 4G

ADVANCING DIRECTION ↑

| 1 | 1 | 1 |
|---|---|---|
| 1 | × | 1 |
| 0 | 0 | 0 |

DIRECTION #7

FIG. 4H

ADVANCING DIRECTION ↖

| 1 | 1 | 1 |
|---|---|---|
| 1 | × | 0 |
| 1 | 0 | 0 |

DIRECTION #8

FIG. 7A

ADVANCING DIRECTION ←

| 1 | 0 | 0 |
|---|---|---|
| 1 | × | 0 |
| 1 | 0 | 0 |

DIRECTION #1

FIG. 7B

| 0 | 0 | 0 |
|---|---|---|
| 1 | × | 0 |
| 1 | 1 | 0 |

ADVANCING DIRECTION ↙

DIRECTION #2

FIG. 7C

| 0 | 0 | 0 |
|---|---|---|
| 0 | × | 0 |
| 1 | 1 | 1 |

ADVANCING DIRECTION ↓

DIRECTION #3

FIG. 7D

| 0 | 0 | 0 |
|---|---|---|
| 0 | × | 1 |
| 0 | 1 | 1 |

ADVANCING DIRECTION ↘

DIRECTION #4

FIG. 7E

| 0 | 0 | 1 |
|---|---|---|
| 0 | × | 1 |
| 0 | 0 | 1 |

ADVANCING DIRECTION →

DIRECTION #5

FIG. 7F

| 0 | 1 | 1 |
|---|---|---|
| 0 | × | 1 |
| 0 | 0 | 0 |

ADVANCING DIRECTION ↗

DIRECTION #6

FIG. 7G

ADVANCING DIRECTION ↑

| 1 | 1 | 1 |
|---|---|---|
| 0 | × | 0 |
| 0 | 0 | 0 |

DIRECTION #7

FIG. 7H

ADVANCING DIRECTION ↖

| 1 | 1 | 0 |
|---|---|---|
| 1 | × | 0 |
| 0 | 0 | 0 |

DIRECTION #8

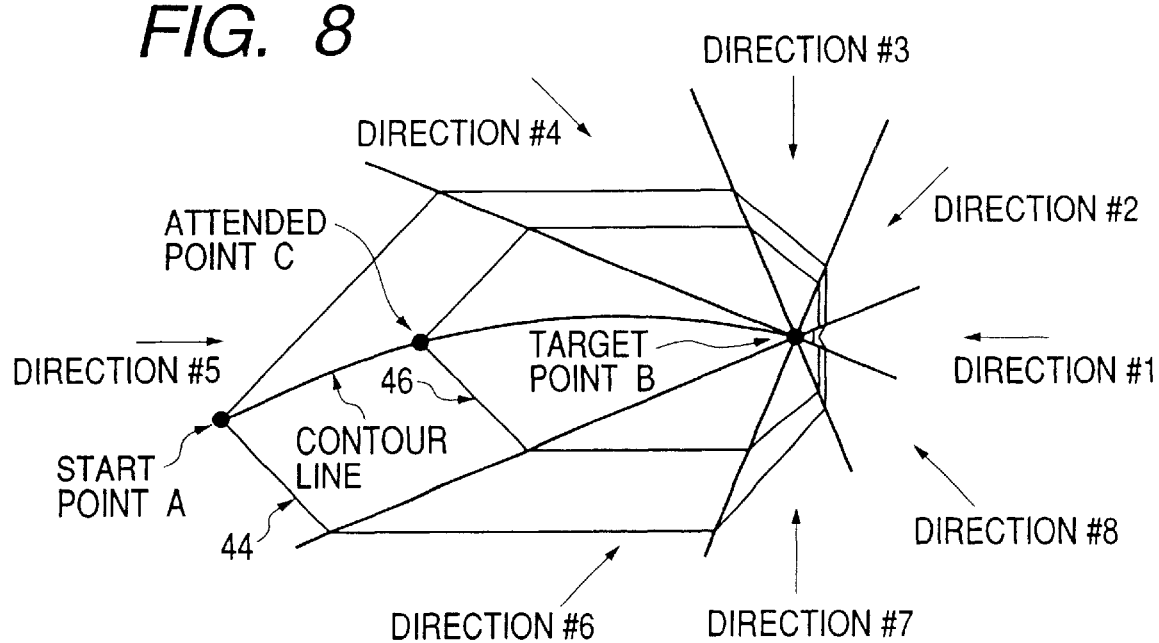

IMAGE PROCESSING APPARATUS, METHOD AND STORAGE MEDIUM

BACKGROUND OF THE INVENTION

1. Field of the Invention

The present invention relates to an image processing apparatus, method and storage medium.

2. Related Background Art

Conventional contour extraction methods include (1) a binarizing method of binarizing an image and tracing a boundary of an obtained binary pattern to extract a contour, (2) a tracing method of using a multivalued edge image, referring to the past tracing direction and tracing a local maximum edge pixel to extract the contour, (3) an area limiting method of detecting a boundary point of an object and a background in a pre-limited area to extract the contour, and (4) an active contour method of moving a closed curve surrounding an object to be cut out so that the predefined energy is minimized to extract the contour of the object.

The following method is known as the binarizing method. Specifically, a method described in Japanese Patent Publication No. 7-62873 comprises the steps of first binarizing an input image with an appropriate threshold value, removing noise from the obtained binary pattern, using an attended contour point as a center to search for the pixel in the vicinity in a clockwise or counterclockwise direction, detecting the next contour point, using the found contour point as a new attended point, and subsequently repeating the same processing to extract a contour pixel. In a method described in Japanese Patent Application Laid-Open No. 8-50655, an edge image constituted of an edge with one pixel width is first prepared. Specifically, a differential space filter or the like is applied to the input image to sharpen the image. If the edge width does not reach one pixel, a fine line processing is applied. After the edge image is prepared, in the same manner as in the method described in the Japanese Patent Publication No. 7-62873, the pixel in the vicinity is searched for in the clockwise or counterclockwise direction centering on the attended point to detect the next edge image.

In the tracing method, the multivalued edge image is used, and the pixel with the maximum edge strength is selected as the contour pixel from the pixels in the vicinity of the attended pixel. In the invention of Japanese Patent No. 2645995, on the assumption that it is natural to perform the next tracing in the same direction as the past tracing direction, the pixel edge strength along the past tracing direction is strongly weighted, the edge is traced, and the contour line is determined from a trace result.

In the area limiting method, the contour line is extracted only from a strip area which is set so as to include the contour line. In a method described in Japanese Patent Application Laid-Open No. 63-55101, an operator first roughly traces along the contour line. The strip area having a predetermined width is selected along the traced locus, and the image contour is determined from a tone value difference in the strip area. A method described in U.S. Pat. No. 5,617,487 (Japanese Patent Application Laid-Open No. 7-92650) comprises the steps of connecting at least two points designated on the contour line to form the strip area, and repeatedly executing a processing of detecting the contour point of the object in the width direction of the strip area while moving in the longitudinal direction of the strip area, to extract the contour line of the object.

In the active contour method, the contour line of the object is extracted by moving the closed curve surrounding the object to be cut out so that the predefined energy is minimized. For example, in "Snakes: Active Contour Models" authored by M. Kass, A. Witkin and D. Terzopoulos, International Journal of Computer Vision, Vol. 1, No. 4, pp. 321–331, 1988 is described a method of contracting/ deforming the contour so that the sum of an energy applied in accordance with the shape of a contour model (internal energy), an energy applied in accordance with an image property (image energy), and an energy applied from the outside (external energy) is minimized.

The binarizing method has the following problems. Specifically, since the binarizing method is limited to an image from which the object can be extracted by a binarizing processing, for example, an image with a plain background, the method cannot be applied to a natural image. Even if the background is plain, in the binarizing processing of the natural image photographed under lighting conditions which cannot be managed, it is difficult to set the threshold value, and it is also difficult to automate the processing. After the binarizing processing, additional processings such as the fine line forming are usually necessary. Therefore, the processing system is complicated and enlarged in size, and it is difficult to realize speeding up.

The tracing method has the following problems. At the start of the tracing, since there is no clue to the tracing direction, the tracing is performed in a wrong direction in some cases. Since the object is traced without any target point, there is no guarantee that the tracing returns to a correct contour line at the time of tracing failure. Therefore, once the contour deviates, the tracing takes a winding course. When the tracing fails, the tracing is preferentially performed in the wrong direction, and continuously advances. Even when the correct contour line is returned, an error portion by the wrong tracing is emphasized.

The area limiting method has the following problems. Specifically, when the contour line is circular arc shaped, a plurality of short strip areas need to be set so that the contour line is uniformly included, which requires a very large number of processes. When the strip area can be curved, the operator is requested to trace along the contour line, or finely set reference points. Therefore, when the object has a complicated shape, a burden on the operator is large. In other words, the method is unsuitable for the object having a complicated shape.

Further, when the edge strength of the background running in the vicinity of the contour line included in the strip area is stronger than the edge strength of the true contour of the object, the background edge is wrongly detected. As a countermeasure, in the U.S. Pat. No. 5,617,487 is described a method which comprises the steps of setting a contour point determining weight distribution in the strip width direction of the strip area, and raising the edge detecting sensitivity in the vicinity of the center line of the strip area. In this method, the operator has to cautiously set the strip area so that the contour line is positioned in the vicinity of the center of the strip area. This is a complicated and laborious operation, and requires considerable skills. Of course, even when the weight distribution is set in this manner, in a case in which the edge strength of the background is strong, the background edge is wrongly detected. Therefore, this countermeasure is not perfect.

The active contour method has the following problems. Specifically, this method is sensitive to the precision of an initial value, that is, the initially set position of the closed curve. If the initial setting is bad, a correct contour is not converged. The calculation amount is usually enormous, and the speeding up is difficult. An energy function is defined on the assumption that the contour line is smooth, and the method is poor in extracting the contour line which changes in an acute angle.

SUMMARY OF THE INVENTION

An object of the present invention is to provide an image processing apparatus, method and storage medium to solve these problems.

Another object of the present invention is to provide an image processing apparatus, method and storage medium in which an image contour can highly precisely be extracted from a wide-range natural image including a complicated background with a simple operation at a high speed.

To achieve the above-described objects, a preferred embodiment of the present invention comprises a trace processing step of tracing a boundary of an image to be extracted among input images, and a limiting step of limiting a tracing direction when the trace processing step is performed.

According to another embodiment of the present invention, there is provided a contour extraction apparatus which comprises image input means for inputting an image, edge extraction means for extracting an edge from the input image inputted by the image input means, image display means for displaying the image, contour extraction interval setting means for designating a contour extraction interval from the input image, and contour extraction means for extracting a contour line from the input image. The contour extraction means comprises tracing means for tracing a pixel with a large edge strength from an edge point of a contour present in the contour extraction interval toward the other edge point, and mask processing means for successively applying a mask processing to a pixel in the vicinity centering on an attended point whose edge strength is to be compared in accordance with a positional relation of the attended point during contour tracing and an end point of the contour tracing.

Moreover, one embodiment of the present invention comprises an edge extracting step of extracting an edge from an input image, a contour extraction interval setting step of designating a contour extraction interval from the input image, and a contour extracting step of extracting a contour line from the input image. The contour extracting step comprises a tracing step of tracing a pixel with a large edge strength from an edge point of a contour present in the contour extraction interval toward the other edge point, and a mask processing step of successively applying a mask processing to the pixel in the vicinity centering on an attended point whose edge strength is to be compared in accordance with a positional relation of the attended point during contour tracing and an end point of the contour tracing.

Further, one embodiment of the present invention comprises a contour extraction interval setting step of setting a contour extraction interval, an edge point setting step of setting a start point and an end point for contour tracing in the contour extraction interval, a positional relation calculating step of calculating a positional relation between an attended point during the contour tracing and the end point, a mask processing step of applying a mask processing to the attended point in accordance with the obtained positional relation, a searching step of searching for a pixel with a maximum edge strength in the pixel in the vicinity of the attended point, an attended point renewing step of setting the pixel with the maximum edge strength as the next attended point, and a determining step of determining whether or not the attended point reaches the end point and repeating the positional relation calculating step, the mask processing step, the searching step, the attended point renewing step and the determining step until the attended point reaches the end point.

The present invention relates to an image processing apparatus, an image processing method and a storage medium which have inventive functions.

Further functions and characteristics of the present invention will be apparent from the following drawings and embodiments.

BRIEF DESCRIPTION OF THE DRAWINGS

FIGS. 4A, 4B, 4C, 4D, 4E, 4F, 4G and 4H show examples of a blind mask;

FIGS. 7A, 7B, 7C, 7D, 7E, 7F, 7G and 7H show other examples of the blind mask;

FIG. 8 is an explanatory view showing the change of the range in which the contour tracing can be performed in the second embodiment;

FIGS. 9A, 9B, 9C and 9D show examples of a weighted mask;

DETAILED DESCRIPTION OF THE PREFERRED EMBODIMENTS

Embodiments of the present invention will be described hereinafter in detail with reference to the drawings.

Figure 1:
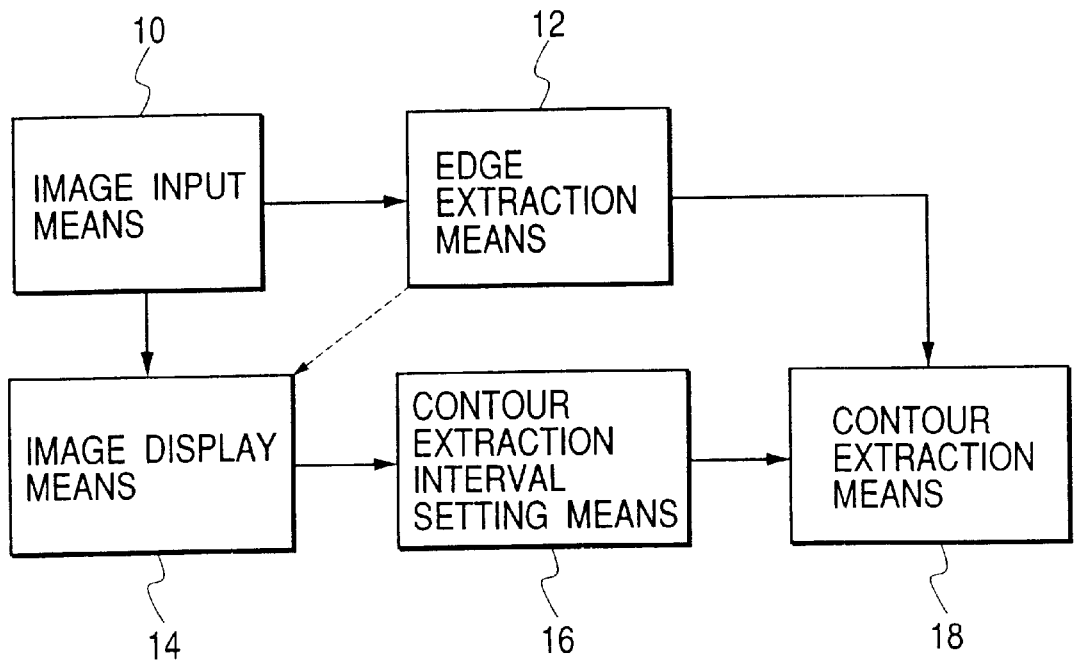
FIG. 1 is a schematic block diagram of a first embodiment of the present invention.

FIG. 1 is a schematic block diagram of a first embodiment of the present invention. Reference numeral 10 denotes image input means, 12 denotes edge extraction means for extracting an image edge, 14 denotes image display means for displaying an image, 16 denotes contour extraction interval setting means for setting an interval in which a contour line is extracted, and 18 denotes contour extraction means for extracting the contour line.

The image input means 10 may be an apparatus or a processing in which an optical image is converted to an electric signal by a photoelectric converting element, and taken image information is outputted, such as a TV camera, a video camera, a digital camera and an image scanner, or may be an apparatus or a processing in which image information is taken from an image data file stored in a certain storage apparatus.

The edge extraction means 12 extracts an edge component from an input image. In this case, an edge extracting method may be a method with a space differential processing applied thereto represented by Sobel operator, Laplacian operator, and the like, or a method using template matching such as Prewitt operator and Kirsch operator.

Figure 12:
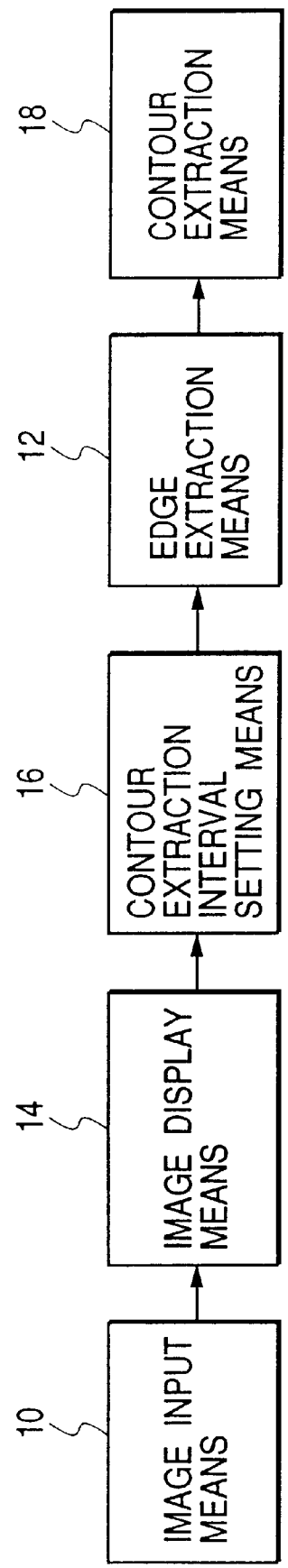
FIG. 12 is a schematic block diagram showing a modification of the first embodiment.

A constitution as shown in FIG. 12 is effective for reducing the operation amount of edge extraction. The constitution shown in FIG. 12 is a modification of the embodiment shown in FIG. 1, and the edge extraction means 12 is disposed in the stage subsequent to the contour extraction interval setting means 16. Details are described later, but the edge extraction processing can be limited to a contour traceable range which is determined by the contour extraction interval and a mask described later. Further, when the edge extraction means 12 is incorporated in the contour extraction means 18, the edge extraction processing can be applied only to the pixel in the vicinity at the moment the pixel in the vicinity whose edge strength is compared is determined.

The image display means 14 is, for example, a TV monitor for displaying the input image. The image display means 14 not only displays the input image but also can selectively display the edge image extracted by the edge extraction means 12.

The contour extraction interval setting means 16 is a user interface (UI) for the operator to set the interval of a contour line intended to be extracted while looking at the input image or the edge image displayed by the image display means 14.

The contour extraction means 18 uses the edge image extracted by the edge extraction means 12 to extract the contour line in the interval designated by the contour extraction interval setting means 16.

It goes without saying that the first embodiment can be operated not only on a dedicated apparatus constituted as shown in FIG. 1 but also extensively on a general-purpose personal computer and work station.

Figure 2:
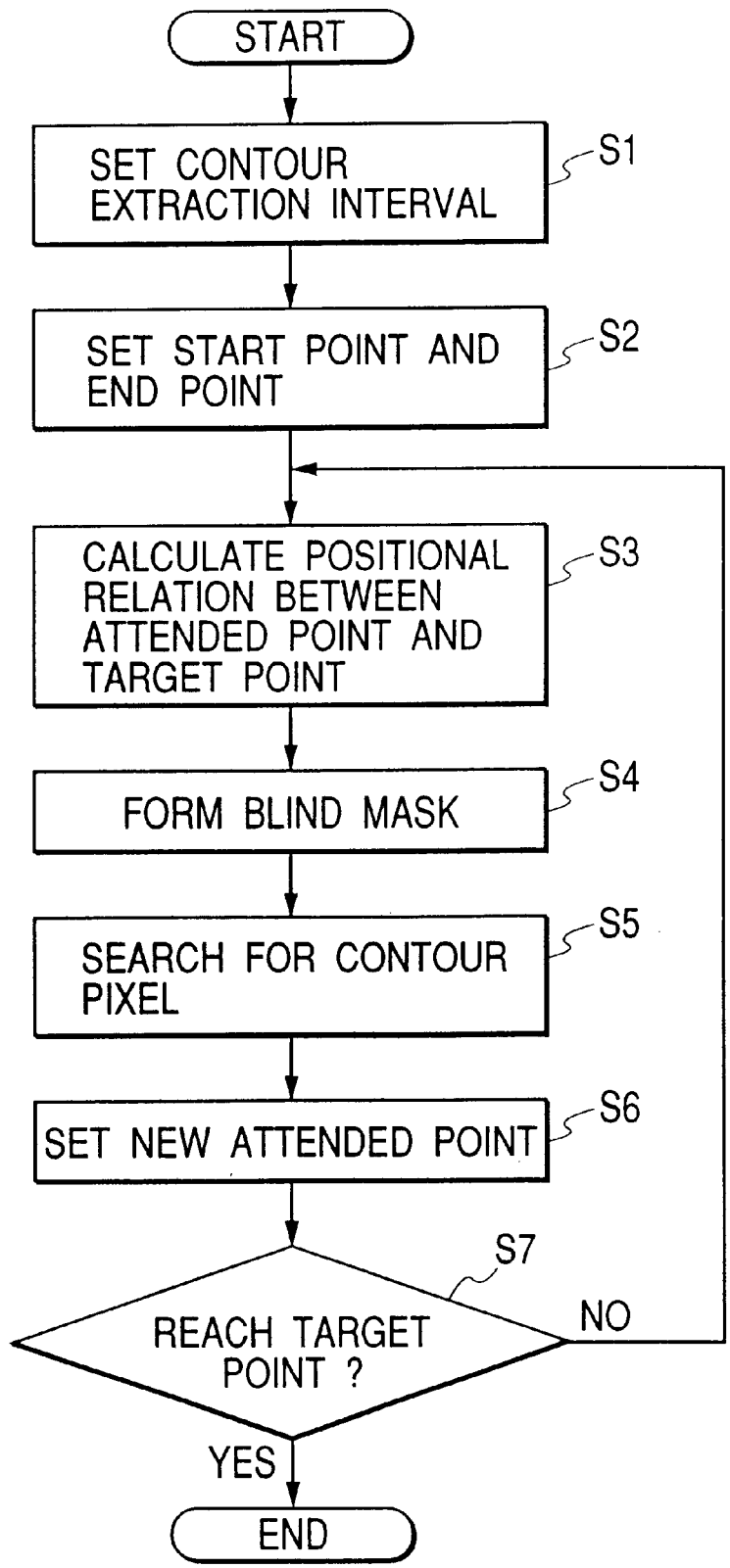
FIG. 2 is a flow chart of a contour extraction processing in the first embodiment.

FIG. 2 is a flow chart showing the internal processing of the contour extraction interval setting means 16 and the contour extraction means 18. The operation of the first embodiment will be described with reference to FIG. 2.

First, the contour interval intended to be extracted is designated (S1). For example, the operator uses a pointing device like a mouse to designate both edge points (start point and end point) between which the contour interval intended to be extracted is disposed. The operator may move the mouse, place a cursor in the vicinity of the edge point of the contour interval intended to be extracted, and depress a mouse button.

The start point designated in S1 is used as the initial position of an attended point, and the end point is set as a contour tracing target point (S2). For example, the pixel with the highest edge strength is searched from 25 pixels in a range of ±2 pixels centering on the mouse cursor position on the image at the moment the mouse button is depressed. The searched pixel positions are determined as the edge points, the first designated point is set as the start point, and the next designated point is set as the end point. The start point is also set as the initial position of the attended point, and the end point is also set as the target point during the contour tracing.

The positional relation of the attended point and the target point is calculated (S3). For example, the angle formed by the attended point and the target point is obtained when the target point is used as a reference. When the coordinate of the attended point is $(x_0, y_0)$, and the coordinate of the target point is $(x_1, y_1)$, an angle θ formed by two points is given by the following equation:

$$\theta = \arctan((y_0 - y_1)/(x_0 - x_1)) \quad (1)$$

Figure 3:
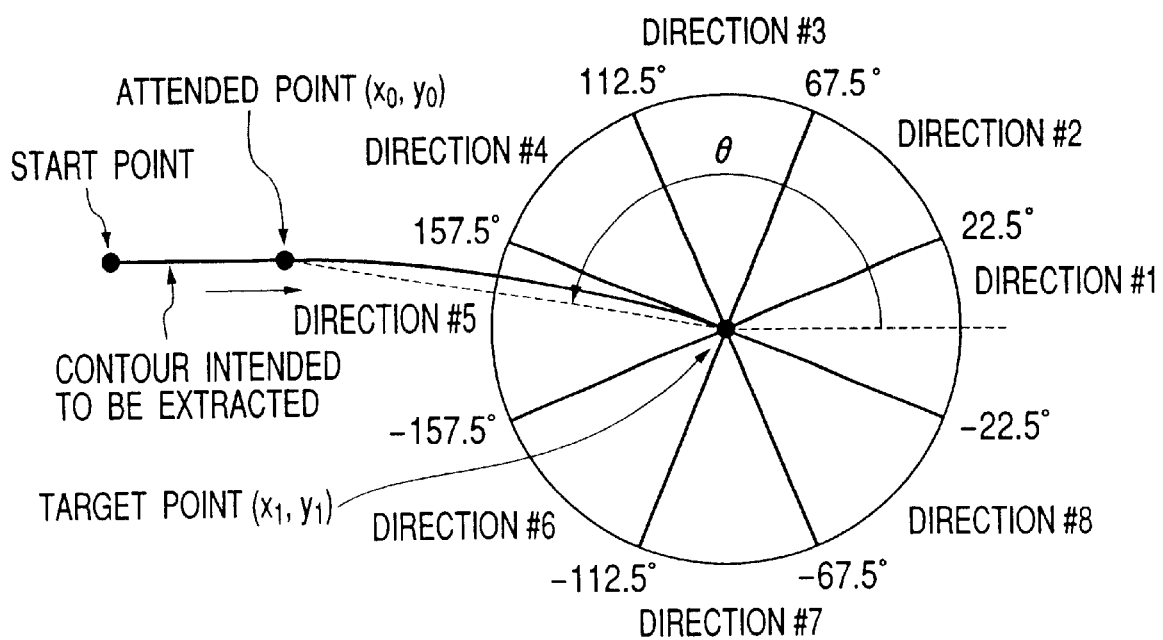
FIG. 3 is a schematic view showing an angle formed by an attended point during contour tracing and a target point of the contour tracing, and an angle classification example.

As shown in FIG. 3, the angle θ calculated from the equation (1) is classified in either one of eight directions divided every 45 degrees. Specifically, direction #1 is in a range of −22.5 to 22.5 degrees, direction #2 is in a range of 22.5 to 67.5 degrees, direction #3 is in a range of 67.5 to 112.5 degrees, direction #4 is in a range of 112.5 to 157.5 degrees, direction #5 is in a range of 157.5 to 180 degrees and −180 to −157.5 degrees, direction #6 is in a range of −157.5 to −112.5 degrees, direction #7 is in a range of −112.5 to −67.5 degrees, and direction #8 is in a range of −67.5 to −22.5 degrees.

In FIG. 3, since θ is in the range of 157.5 to 180 degrees and −180 to −157.5 degrees, the direction #5 is taken.

Subsequently, a blind mask for blinding the pixel in the vicinity of the attended point is formed (S4). The blind mask shown in FIGS. 4A to 4H are applied to eight pixels in the vicinity centering on the attended point during the contour tracing in accordance with the above-described eight directions. In FIG. 3, since the obtained θ has the direction #5, the mask corresponding to the direction #5 is set. In FIGS. 4A to 4H, symbol x denotes the position of the attended point, '1' denotes a movable pixel, and '0' denotes a pixel inhibited from moving (masked pixel). In this blind mask, there are five pixels which can advance, and three pixels which are inhibited from advancing. In this mask processing, while a considerably free contour line tracing is permitted, restriction is applied so as to securely converge to the target point.

The pixel with the maximum edge strength is searched for from the pixels in the vicinity of the attended point (S5). Specifically, the pixel having the maximum edge strength is searched for from the pixels in the vicinity which are not masked in the step 4.

Figure 5:
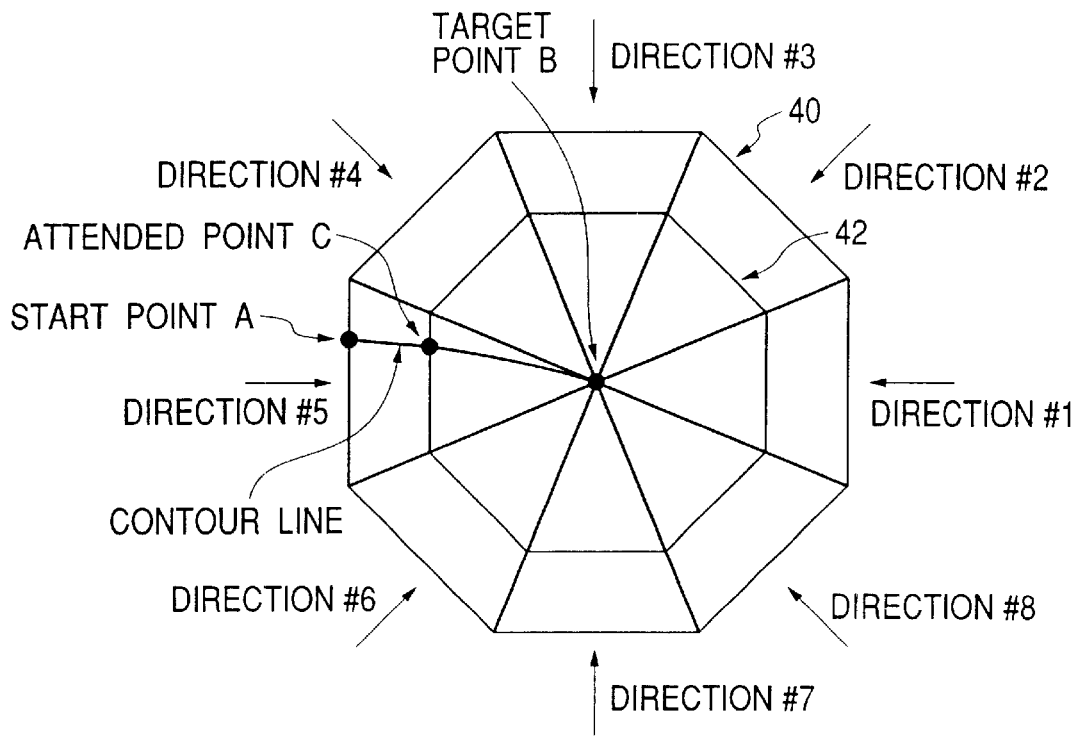
FIG. 5 is an explanatory view of a change of a range in which the contour tracing can be performed in the first embodiment.

The contour pixel selected in S5 is set as a new attended point (S6). Specifically, the pixel searched for in step 5 is regarded as the next attended point, and movement is performed by one pixel. FIG. 5 shows a range in which the contour tracing can move according to the first embodiment. In the first embodiment, free tracing is permitted excluding only a direction of retreating from the target point. At the moment the attended point is in a start point A, that is, at the start of the contour tracing, the attended point can move in a range of an octagon 40 at maximum. However, the attended point cannot freely move in the range of the octagon 40 until the attended point reaches an end point B. When the attended point reaches a point C on the contour, the movable area is limited to a range of an octagon 42. The movable range (octagon) is gradually reduced in this manner as the attended point approaches the target point B. Therefore, the attended point can securely reach the target point B at last.

It is determined whether the attended point reaches the end point, and the operation is repeated from S3 to S6 until a new attended point meets the target point (S7). When the attended point reaches the end point, the contour extraction processing is completed. The final contour line is represented by the address (coordinate value) of the attended point.

In the first embodiment, eight pixels adjacent to the attended point are regarded as the vicinity pixels. When fine portions do not need to be traced, or when a smoother contour is intended to be obtained, the vicinity pixel apart from the attended point by two or more pixels may be used to perform the similar processing.

The first embodiment has the following advantages. Specifically, since a restrictive condition on the contour tracing is only "not to retreat from the target point", the degree of freedom of a trace route is remarkably high. In the contour line with a moderate curvature change, a large contour in which the target point is reached from the back can be traced. As a result, the operator can set a broad space between the start point and the end point of the contour interval intended to be extracted, and the operation amount is minimized. By preparing the blind mask for each movement of the attended point, the trace route has a high degree of freedom, while it is guaranteed that the attended point can securely reach the end point. During the contour tracing, since only the vicinity pixels centering on the attended point are given as a field of view, the strong edge close to the contour line and other than the contour line is not bewildering. Specifically, the probability of wrongly detecting a strong edge in the vicinity is low.

Figure 6:
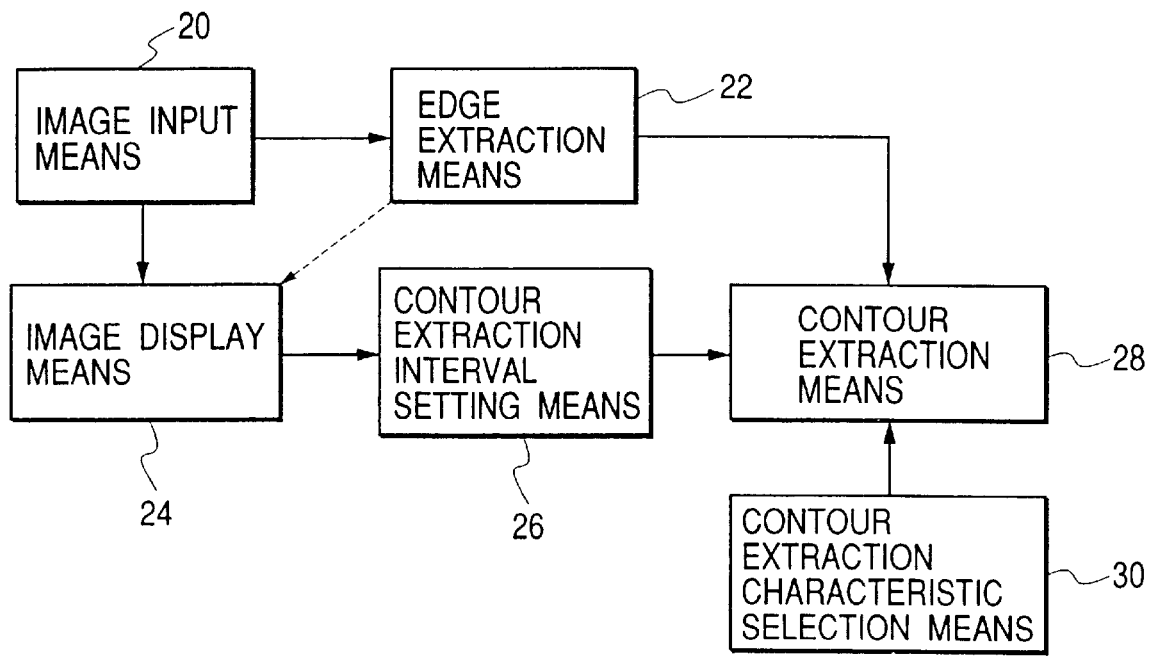
FIG. 6 is a schematic block diagram of a second embodiment of the present invention.

FIG. 6 is a schematic block diagram of a second embodiment of the present invention. Reference numeral 20 denotes image input means, 22 denotes edge extraction means for extracting the image edge, 24 denotes image display means for displaying an image, 26 denotes contour extraction interval setting means for setting the interval in which the contour line is extracted, 28 denotes contour extraction means for extracting the contour line, and 30 denotes contour extraction characteristic selection means for presenting different contour extraction characteristics to the operator. The actions of the image input means 20, edge extraction means 22, image display means 24 and contour extraction interval setting means 26 are the same as those of the image input means 10, edge extraction means 12, image display means 14 and contour extraction interval setting means 16 of the embodiment shown in FIG. 1.

In the embodiment shown in FIG. 1, the restrictive condition to the contour tracing is relaxed to the utmost, and the maximum degree of freedom of the trace route is secured. Thereby, the embodiment shown in FIG. 1 is extremely effective in the contour interval in which the edge strength of the contour line is large and the edge strength other than that of the contour line is not very large. In the embodiment shown in FIG. 1, however, for the image in which the edge other than the contour line with the large edge strength abuts on or intersects a true contour line, since the field of view is broad, a possibility of trace mistake is raised. This respect is considered, and in the embodiment shown in FIG. 6, a blind mask shown in FIGS. 7A to 7H is prepared in addition to the blind mask (FIGS. 4A to 4H) used in the embodiment shown in FIG. 1, so that the operator can select the blind mask to be used by the contour extraction characteristic selection means 30.

While five directions can be traced in the blind mask shown in FIGS. 4A to 4H, the traceable directions are limited to three directions in the blind mask shown in FIGS. 7A to 7H. This is equal to the restrictive condition "the target point be constantly approached" given to the contour tracing. As compared with the mask processing shown in FIGS. 4A to 4H, the degree of freedom of the contour tracing route is reduced, but the possibility of wrongly detecting the edge close to the contour and other than the contour is accordingly reduced, and safety is enhanced.

FIG. 8 shows the contour traceable range when the blind mask shown in FIGS. 7A to 7H is used. A range 44 indicates the traceable range when the attended point is in the start point A, and a range 46 indicates the traceable range when the attended point is in the point C. As the attended point approaches the target point, the traceable range is gradually reduced, and the attended point securely reaches the target point at last.

For the contour extraction results by different contour extraction characteristics, the operator may refer to the trace results and select the result, for example, with the mouse button, or the result may automatically be selected using indexes such as the smoothness of the contour line, the average of the edge strength on the contour line, and the length of the contour line.

The second embodiment has the following advantages. Specifically, when the edge other than the contour is strong, the blind mask shown in FIGS. 4A to 4H is applied. When the edge of the contour line is strong, the blind mask shown in FIGS. 7A to 7H is selected. Since the contour extraction characteristic can be changed in this manner, the application range of the contour extraction is broadened. Even with a sample in which the contour is correctly extracted with any contour extraction characteristic, a difference may be generated in the contour line extraction precision when the blind mask shown in FIGS. 4A to 4H is used and when the blind mask shown in FIGS. 7A to 7H is used. Since the blind mask shown in FIGS. 4A to 4H has a broader field of view, the contour is extracted more sharply. Therefore, the operator can refer to the contour extraction result and select the extraction result more suitable for the purpose.

In the first and second embodiments, the binary mask processing is performed on the pixels in the vicinity of the attended point. The contour extraction characteristic can more finely be changed by using a multivalued weighting coefficient in addition to the binary mask. FIGS. 9A to 9D show four mask examples for multivalued weighting to the direction #5. Of course, the weighting coefficient may be changed more finely. In this case, when a graphical user interface (GUI) such as a slide bar is employed as the contour extraction characteristic selection means 30, the contour extraction characteristic can continuously be changed. Of course, the corresponding numeric value may be inputted.

When there is no clear difference in the size of each edge strength of the pixels in the vicinity of the attended point, that is, where the edge is discontinued or the contrast is low, the weighted mask is automatically selected from the weighted masks shown in FIGS. 9B to 9D, so that the tracing can be continued preferentially in the direction toward the target point.

The use of the multivalued weighted mask has the following advantages. Specifically, by preparing a plurality of blind masks having different weighting coefficients so that the blind mask can freely be selected in accordance with the image around the contour, the contour can precisely be extracted even from an object having a broad shape. Since the result closest to the true contour can be selected from a plurality of contour extraction results, a high-precision contour extraction can be realized. Even in the place where the edge is not clear, the contour tracing can be continued toward the target point.

In the above-described embodiments, the contour is traced in one direction from the start point to the end point. However, in the contour tracing only in one direction, there is a possibility of advancing in a wrong direction at an edge branch path. To solve the problem, the start point and the end point may be replaced, so that a reverse contour tracing can be selected and performed.

Figure 10A:
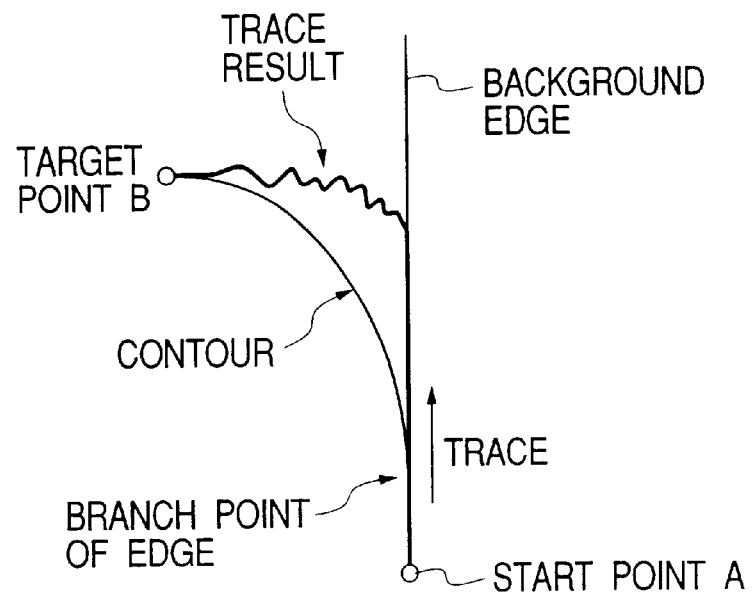
FIGS. 10A and 10B are explanatory views showing the effect of bi-directional contour tracing.
Figure 10B:
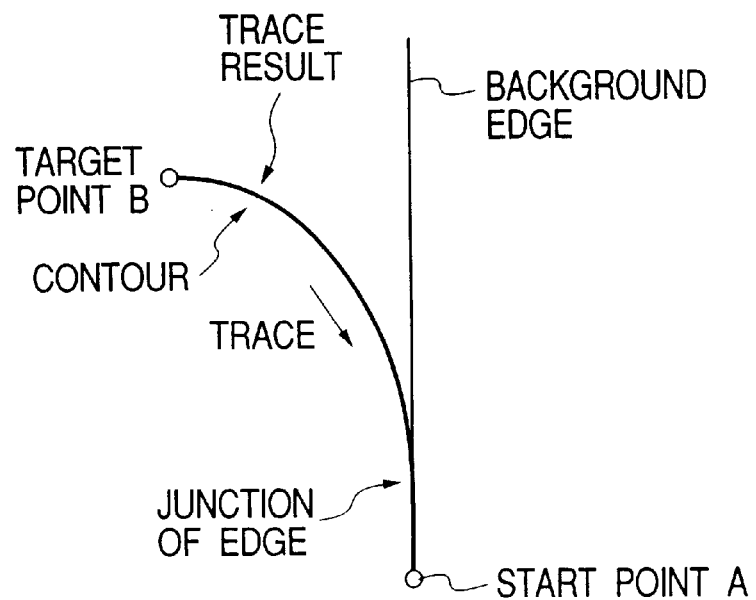

The action of a reverse direction trace will be described with reference to FIGS. 10A and 10B. FIGS. 10A and 10B show the true contour line and a background edge overlapped with the contour line. The edge strength of the background edge is set to be larger. FIG. 10A shows the above-described forward-direction trace, and FIG. 10B shows a backward-direction trace.

In FIG. 10A, the contour is traced from the lower start point A toward the upper end point B. When the contour is traced in the situation of FIG. 10A, the trace advances toward the background edge with a higher edge strength, deviates from the background edge by the operation of the blind mask midway, and advances to the end point B as shown in FIG. 10A. FIGS. 10A shows a typical edge trace failure example.

On the other hand, in FIG. 10B, since the start and end points of FIG. 10A are replaced, the contour tracing advances downward from above in a backward direction of the direction of FIG. 10A. A branch point of edge in FIG. 10A changes to a junction of edge in FIG. 10B. Since the blind mask inhibits the tracing apart from the target point, the contour tracing fails to advance toward the background edge at the junction. Therefore, although the stronger background edge exists, a correct contour can be extracted.

Figure 11:
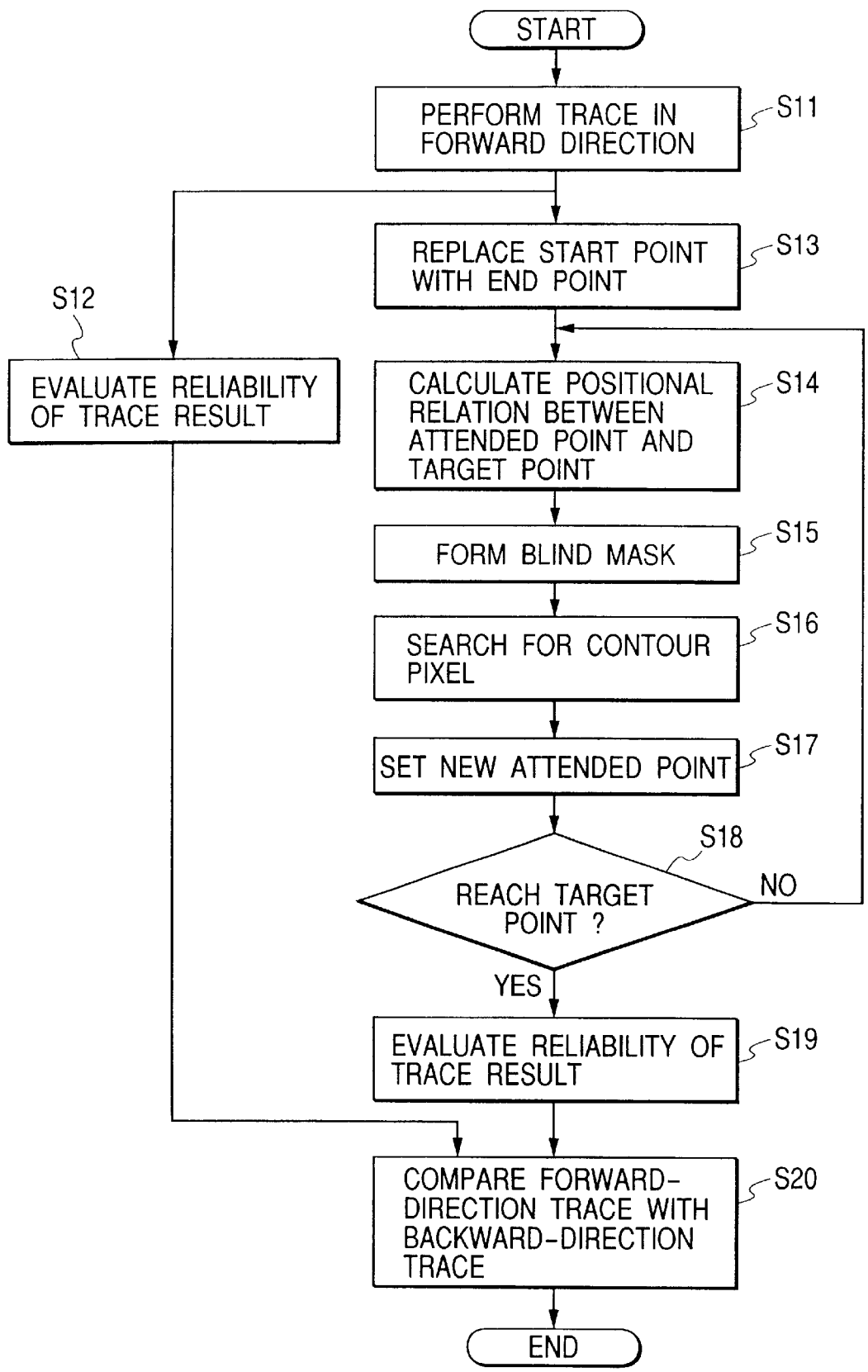
FIG. 11 is a flow chart of a contour extraction processing in the bi-directional tracing.

FIG. 11 is a flow chart showing the backward-direction trace. The contour is traced in a forward direction (S11). The step S11 has the same processing content as that of the flow chart shown in FIG. 2.

The reliability of a forward-direction contour trace result is evaluated (S12). For example, the smoothness of the contour line, the average value of the edge strength on the contour line, the length of the contour line, and the like are individually evaluated, or these are evaluated in a combined manner by weighting or loading.

The start point is replaced with the end point (S13), and the contour is traced in the similar manner to the forward-direction trace (S14 to S18). The reliability of the backward-direction contour trace result is evaluated (S19).

The reliability of the forward-direction contour trace result is compared with that of the backward-direction contour trace result (S19), and the contour trace result with a higher reliability is selected, thereby ending the operation.

In FIG. 11, a bi-directional contour tracing is performed, and the contour trace result with a higher reliability is automatically selected, but the bi-directional contour trace may naturally be selected by the operator. In this case, the forward-direction contour trace is first performed, and the trace result is displayed. When the operator is not satisfied with the trace result, the backward-direction contour trace with the start and end points replaced with each other is started, for example, with a simple operation of clicking the mouse button, and the trace result is newly displayed. For example, with the simple operation of clicking the mouse button, two trace results can easily be switched and displayed, or overlapped and displayed. The operator can compare the contour trace results of the different directions to easily select the correct contour line.

Since the backward-direction trace can be selected, the following advantage is provided. Specifically, by performing the bi-directional contour trace, and selecting a correct result, an extremely stable contour tracing can be realized without being obstructed by the edge intersecting the contour line and other than the contour.

The effectiveness of the bi-directional contour trace has been described using the edge branch point problem as the example with reference to FIGS. 10A and 10B. By noting that the edge branch point changes to the edge junction as seen in the backward direction, and combining the mask processing to realize the restrictive conditions such as "to advance toward the target point" and "not to move backward in the past advancing direction", an extremely stable contour trace is realized without being obstructed by the edge other than the contour. However, for the effect of the bi-directional contour trace in the present invention, the mask processing is not necessarily a prior condition. When there is no clear edge in the vicinity of both edge points of the contour portion intended to be extracted, the bi-directional contour traces take far different routes. Even in this case, since the true contour line may be extracted in either one of the bi-directional contour trace results, the bi-directional contour trace is securely advantageous as compared with the single-direction contour trace.

The advantages of the present invention with respect to the conventional example are as follows. Specifically, different from the binarizing method, in the present invention, the threshold processing is not performed so that any natural image can be handled. The image contour is extracted by utilizing the multivalued edge image as it is to trace the pixel with the maximum local edge strength.

Different from the tracing method, without utilizing the past trace direction, the mask processing is applied to the pixels in the vicinity centering on the attended point in accordance with the positional relation of the present attended point and the target point (end point) in order to search for the pixel with the maximum edge strength. Thereby, the attended point can securely be converged to the target point.

Different from the area limiting method, in the present invention, the fixed area limitation is not performed from the first. By the mask processing, as the attended point moves, the extraction object area is successively changed. In the successively changing area, the pixel with the largest edge strength is searched for from the pixels in the vicinity centering on the attended point from the start point designated on the contour line toward the end point. The pixel with the largest edge strength is moved as the next attended point, and the pixel with the largest edge strength is again searched for from the pixels in the vicinity centering on the point. This is repeated.

Different from the active contour method, in the present invention, without using the energy function, the combination of the simple comparison of the edge strengths and the simple mask processing is used, thereby realizing a high-speed contour tracing.

As easily understood from the above description, according to the present invention, with a simple operation, the contour can be extracted from a broad range of natural image including a complicated background with a good precision and/or at a high speed.

What is claimed is:

1. A contour extraction apparatus comprising:

image input means for inputting an image;

edge extraction means for extracting an edge from the input image inputted by the image input means;

image display means for displaying the image;

contour extraction interval setting means for designating a contour extraction interval for the input image; and contour extraction means for extracting a contour line from the input image, the contour extraction means comprising: tracing means for tracing one or more pixels with a large edge strength from one edge point toward another edge point of a contour present in the contour extraction interval; and mask processing means for successively applying a mask processing to one or more pixels in a vicinity centered on an attended point, wherein an edge strength of a mask-processed pixel is used for comparison depending upon a positional relationship between the attended point during contour tracing and an end point of the contour tracing, wherein the mask processing means sets a mask under a restrictive condition that the attended point does not retreat from a target point of the contour tracing on the contour line.

2. An apparatus according to claim 1, wherein the mask processing means calculates an angle formed by the attended point and the end point, and successively sets a mask for use in the mask processing in accordance with the obtained angle.

3. An apparatus according to claim 2, wherein the mask processing means sets the mask under a restrictive condition that the attended point always approaches the target point of the contour tracing on the contour line.

4. An apparatus according to claim 2, wherein the mask processing means is provided with a plurality of masks for use in the mask processing, and selects the mask to be applied in accordance with an image characteristic of the contour extraction interval.

5. An apparatus according to claim 4, wherein the mask is a multivalued weighted mask.

6. An apparatus according to claim 1, wherein the contour extraction means performs the contour tracing between said one edge point and said another edge point in a first direction from said one edge point to said another edge point, and in a second direction from said another edge point to said one edge point, each tracing direction producing a contour trace result, wherein the contour extraction means can select either one of the contour trace results.

7. A contour extraction method comprising:
   an edge extracting step of extracting an edge from an input image;
   a contour extraction interval setting step of designating a contour extraction interval for the input image; and
   a contour extracting step of extracting a contour line from the input image,
   the contour extracting step comprising: a tracing step of tracing one or more pixels with a large edge strength from one edge point toward another edge point of a contour present in the contour extraction interval; and a mask processing step of successively applying a mask processing to one or more pixels in a vicinity centered on an attended point, wherein an edge strength of a mask-processed pixel is used for comparison depending upon a positional relationship between the attended point during contour tracing and an end point of the contour tracing,
   wherein the mask processing step sets a mask under a restrictive condition that the attended point does not retreat from a target point of the contour tracing on the contour line.

8. A method according to claim 7, wherein the mask processing step calculates an angle formed by the attended point and the end point, and successively sets a mask for use in the mask processing in accordance with the obtained angle.

9. A method according to claim 8, wherein the mask processing step sets the mask under a restrictive condition that the attended point always approaches the target point of the contour tracing on the contour line.

10. A method according to claim 7, wherein the mask processing step is provided with a plurality of masks for use in the mask processing, and selects the mask to be applied in accordance with an image characteristic of the contour extraction interval.

11. A method according to claim 10, wherein the mask is a multivalued weighted mask.

12. A method according to claim 7, wherein the contour extracting step performs the contour tracing between said one edge point and said another edge point in a first direction from said one edge point to said another edge point, and in a second direction from said another edge point to said one edge point, each tracing direction producing a contour trace result, wherein the contour extraction means can select either one of the contour trace results.

13. A contour extraction method comprising:
   a contour extraction interval setting step of setting a contour extraction interval;
   an edge point setting step of setting a start point and an end point for contour tracing in the contour extraction interval;
   a positional relation calculating step of calculating a positional relation between an attended point during the contour tracing and the end point;
   a mask processing step of applying a mask processing to the attended point in accordance with the calculated positional relation;
   a searching step of searching for a pixel with a maximum edge strength in the vicinity of the attended point;
   an attended point renewing step of setting the pixel with the maximum edge strength as the next attended point; and
   a determining step of determining whether or not the attended point reaches the end point and repeating the positional relation calculating step, the mask processing step, the searching step, the attended point renewing step, and the determining step until the attended point reaches the end point,
   wherein the mask processing step sets a mask under a restrictive condition that the next attended point does not retreat from a target point of the contour tracing on the contour line.

14. A storage medium for storing a program software of a contour extraction method comprising:
   an image input step of inputting an image;
   an edge extracting step of extracting an edge from the input image inputted by the image input step;
   a contour extraction interval setting step of designating a contour extraction interval for the input image; and
   a contour extracting step of extracting a contour line from the input image,
   the contour extracting step comprising: a tracing step of tracing one or more pixels with a large edge strength from one edge point toward another edge point of a contour present in the contour extraction interval; and a mask processing step of successively applying a mask processing to one or more pixels in a vicinity centered on an attended point wherein an edge strength of a mask-processed pixel is used for comparison depending upon a positional relationship between the attended point during contour tracing and an end point of the contour tracing,
   wherein the mask processing step sets a mask under a restrictive condition that the attended point does not retreat from a target point of the contour tracing on the contour line.

15. A storage medium according to claim 14, wherein the mask processing step calculates an angle formed by the attended point and the end point, and successively sets a mask for use in the mask processing in accordance with the obtained angle.

16. A storage medium according to claim 15, wherein the mask processing step sets the mask under a restrictive condition that the attended point always approaches the target point of the contour tracing on the contour line.

17. A storage medium according to claim 14, wherein the mask processing step is provided with a plurality of masks for use in the mask processing, and selects the mask to be applied in accordance with an image characteristic of the contour extraction interval.

18. A storage medium according to claim 17, wherein the mask is a multivalued weighted mask.

19. A storage medium according to claim 14, wherein the contour extracting step performs the contour tracing between said one edge point and said another edge point in a first direction from said one edge point to said another edge point, and in a second direction from said another edge point to said one edge point, each tracing direction producing a contour trace result, wherein the contour extraction means can select either one of the contour trace results.

20. A storage medium for storing a program software of a contour extraction method comprising:

a contour extraction interval setting step of setting a contour extraction interval;

an edge point setting step of setting a start point and an end point for contour tracing in the contour extraction interval;

a positional relation calculating step of calculating a positional relation between an attended point during the contour tracing and the end point;

a mask processing step of applying a mask processing to the attended point in accordance with the calculated positional relation;

a searching step of searching for a pixel with a maximum edge strength in the vicinity of the attended point;

an attended point renewing step of setting the pixel with the maximum edge strength as the next attended point; and a determining step of determining whether or not the attended point reaches the end point and repeating the positional relation calculating step, the mask processing step, the searching step, the attended point renewing step, and the determining step until the attended point reaches the end point, wherein the mask processing step sets a mask under a restrictive condition that the next attended point does not retreat from a target point of the contour tracing on the contour line.

* * * * *